United States Patent
Busbey et al.

(10) Patent No.: US 9,605,651 B2
(45) Date of Patent: Mar. 28, 2017

(54) SPAR ASSEMBLY FOR A WIND TURBINE ROTOR BLADE

(71) Applicant: General Electric Company, Schenectady, NY (US)

(72) Inventors: Bruce Clark Busbey, Greenville, SC (US); Edward McBeth Stewart, Greenville, SC (US)

(73) Assignee: General Electric Company, Schenectady, NY (US)

( * ) Notice: Subject to any disclaimer, the term of this patent is extended or adjusted under 35 U.S.C. 154(b) by 578 days.

(21) Appl. No.: 14/096,408

(22) Filed: Dec. 4, 2013

(65) Prior Publication Data
US 2015/0152839 A1    Jun. 4, 2015

(51) Int. Cl.
*F03D 11/00* (2006.01)
*F03D 1/06* (2006.01)
*F03D 1/00* (2006.01)

(52) U.S. Cl.
CPC ............ *F03D 1/0675* (2013.01); *F03D 1/001* (2013.01); *F05B 2230/60* (2013.01); *F05B 2240/302* (2013.01); *Y02E 10/721* (2013.01); *Y02E 10/728* (2013.01); *Y02P 70/523* (2015.11); *Y10T 29/49337* (2015.01)

(58) Field of Classification Search
CPC ................ F03D 1/0675; F05B 2230/60; F05B 2240/302; Y02E 10/721
See application file for complete search history.

(56) References Cited

U.S. PATENT DOCUMENTS

| 2,456,007 | A |  | 3/1949 | Bragdon et al. |
| 2,981,337 | A |  | 4/1961 | Stuart, III |
| 3,013,614 | A |  | 12/1961 | Platt |
| 4,079,903 | A |  | 3/1978 | Ashton et al. |
| 4,895,491 | A |  | 1/1990 | Cross et al. |
| 5,127,802 | A |  | 7/1992 | Carlson et al. |
| 5,174,024 | A | * | 12/1992 | Sterrett .................. B64C 27/46 29/889.71 |

(Continued)

FOREIGN PATENT DOCUMENTS

| EP | 1808598 | 7/2007 |
| EP | 1950414 A2 | 7/2008 |

(Continued)

OTHER PUBLICATIONS www.wind-energy-the-facts.org/enpart-i-technology/chapter-3-wind-turbine-technology/current-developments.
European Search Report and Opinion issued in connection with corresponding EP Application No. 14193688 on Apr. 23, 2015.

*Primary Examiner* — Ninh H Nguyen
(74) *Attorney, Agent, or Firm* — Dority & Manning, P.A.

(57) ABSTRACT

A spar assembly for a rotor blade of a wind turbine is disclosed. The spar assembly includes a first spar cap segment and a second spar cap segment. The first spar cap segment is configured on an interior surface of a first blade segment and the second spar cap segment is configured on an interior surface of a second blade segment. Each spar cap segment includes an end having a joint section that is joinable at a chord-wise joint. Each of the first and second joint sections includes a plurality of holes formed therein. Further, the spar assembly includes a plurality of pins inserted into the plurality of holes of the first and second joint sections to join the first and second blade segments so as to improve stiffness of the rotor blade.

19 Claims, 6 Drawing Sheets

(56) References Cited

U.S. PATENT DOCUMENTS

| | | | |
|---|---|---|---|
| 7,334,989 B2* | 2/2008 | Arelt | F03D 1/0675 416/2 |
| 7,381,029 B2 | 6/2008 | Moroz | |
| 7,393,184 B2 | 7/2008 | Cairo | |
| 7,654,799 B2* | 2/2010 | Eyb | F03D 1/0675 29/889.71 |
| 7,891,947 B2* | 2/2011 | Chen | F03D 1/0675 416/225 |
| 7,922,454 B1 | 4/2011 | Riddell | |
| 8,075,275 B2 | 12/2011 | Althoff et al. | |
| 8,079,820 B2* | 12/2011 | Stam | F03D 1/0675 416/223 R |
| 8,511,996 B2* | 8/2013 | Llorente Gonzalez | F03D 1/0675 416/132 B |
| 8,517,689 B2 | 8/2013 | Kyriakides et al. | |
| 2008/0069699 A1 | 3/2008 | Bech et al. | |
| 2008/0145231 A1 | 6/2008 | Llorente Gonzales et al. | |
| 2008/0310964 A1 | 12/2008 | Llorente Gonzalez et al. | |
| 2009/0155084 A1 | 6/2009 | Livingston et al. | |
| 2009/0162206 A1 | 6/2009 | Zirin et al. | |
| 2009/0169323 A1 | 7/2009 | Livingston | |
| 2009/0196755 A1 | 8/2009 | Peace et al. | |
| 2009/0208341 A1 | 8/2009 | Llorente Gonzalez et al. | |
| 2009/0226320 A1 | 9/2009 | Torres Martinez | |
| 2010/0132884 A1 | 6/2010 | Baehmann et al. | |
| 2010/0143143 A1 | 6/2010 | Judge | |
| 2010/0143148 A1 | 6/2010 | Chen et al. | |
| 2011/0142667 A1 | 6/2011 | Miebach et al. | |
| 2011/0142675 A1 | 6/2011 | van der Bos | |
| 2011/0293432 A1 | 12/2011 | Hibbard et al. | |
| 2012/0141287 A1* | 6/2012 | Hynum | F03D 1/0675 416/235 |
| 2012/0269643 A1* | 10/2012 | Hibbard | F03D 1/0675 416/226 |

FOREIGN PATENT DOCUMENTS

| | | |
|---|---|---|
| EP | 1 761 702 B1 | 11/2011 |
| EP | 2505824 A2 | 10/2012 |
| EP | 2 288 807 B1 | 9/2013 |
| WO | WO 2006/064077 | 6/2006 |
| WO | WO 2011/070137 | 6/2011 |

* cited by examiner

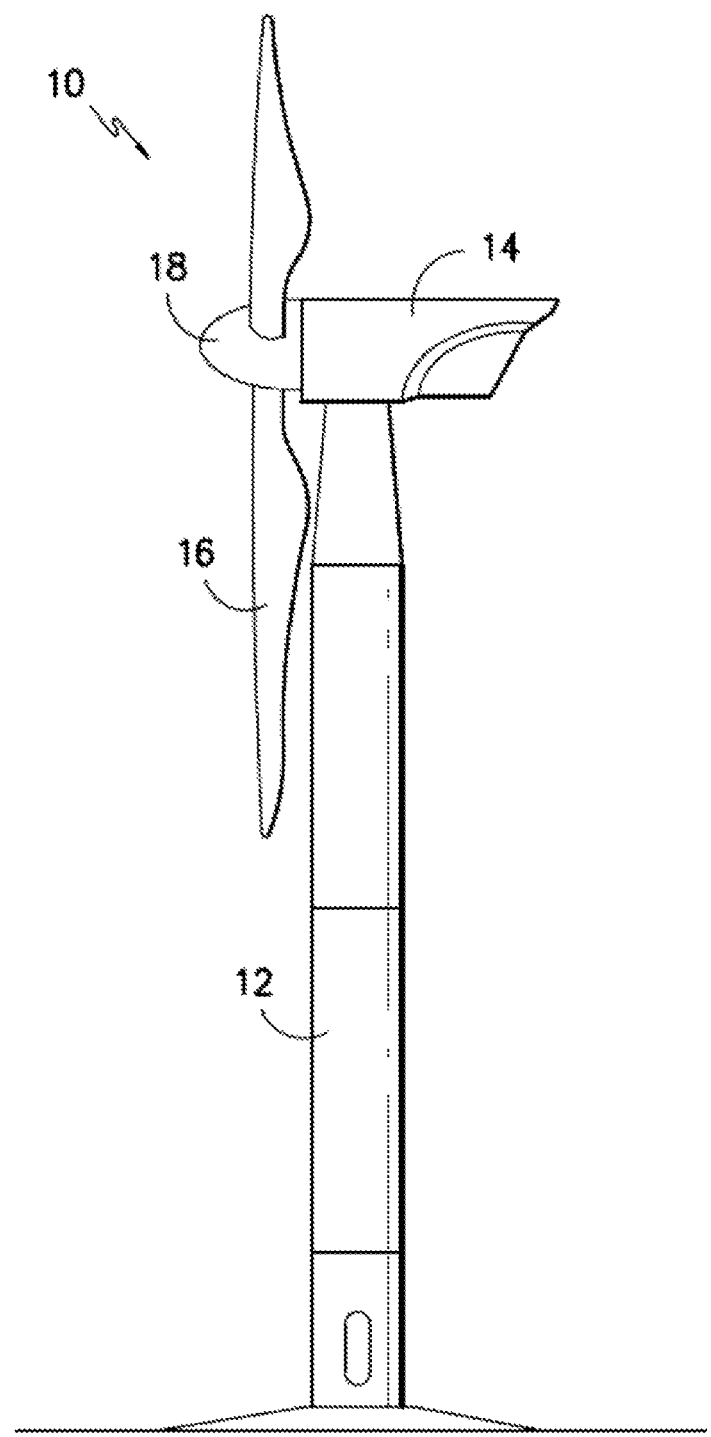
FIG. -1-
PRIOR ART

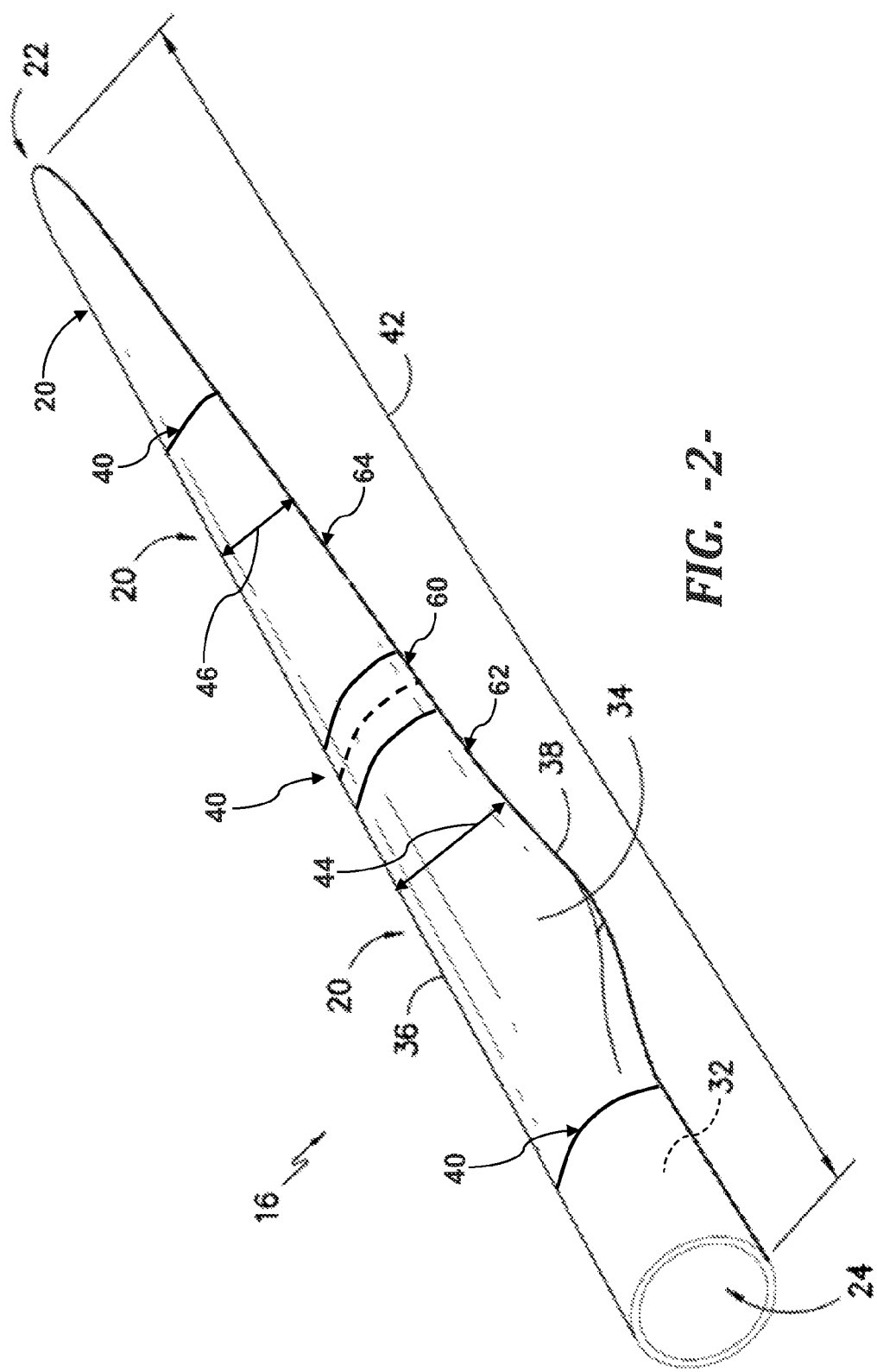
FIG. -2-

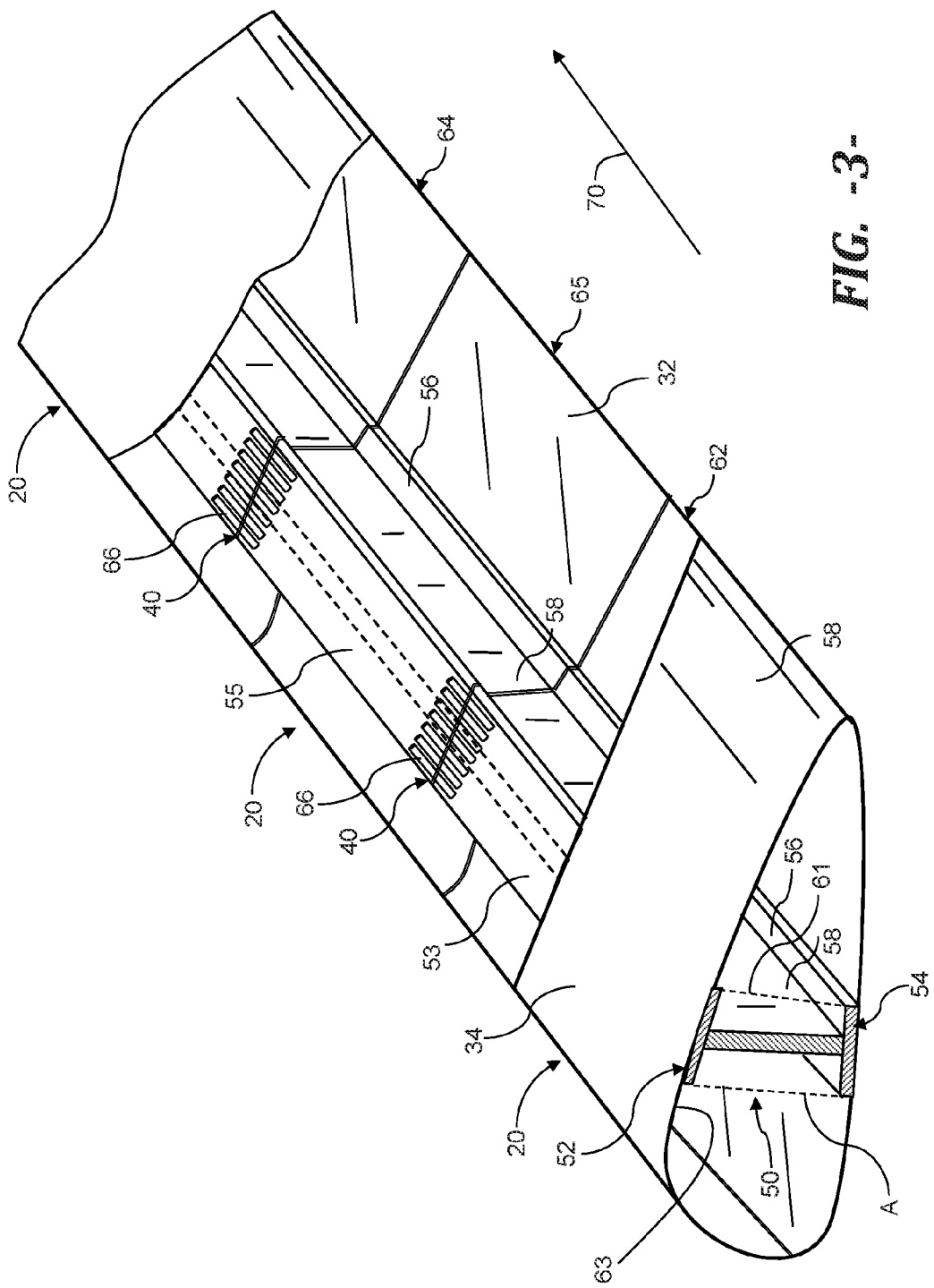

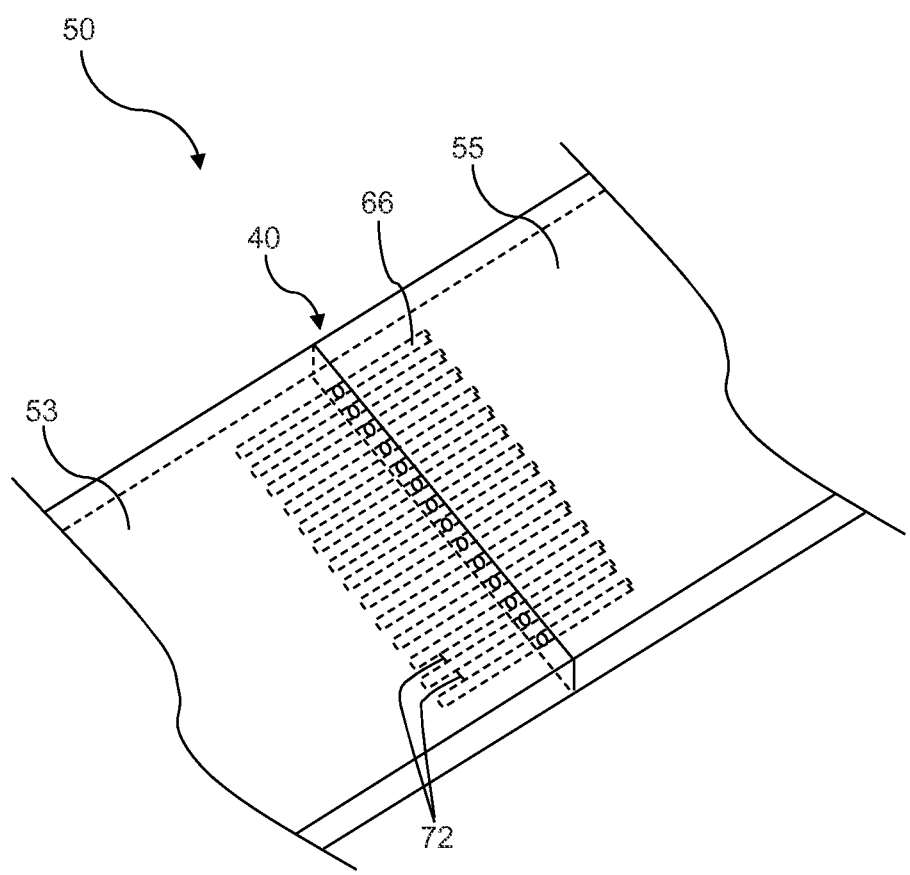
FIG. -4-

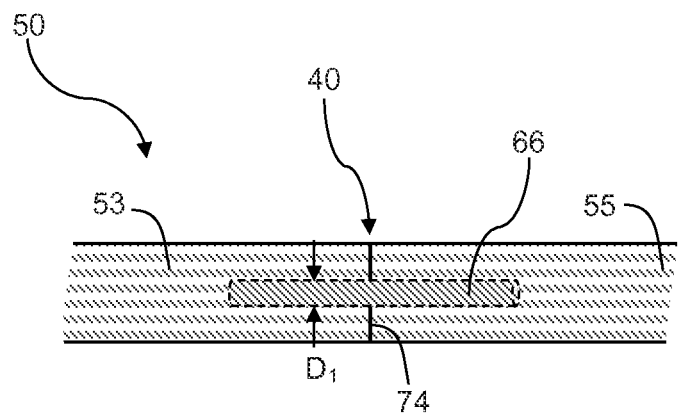
FIG. -5-
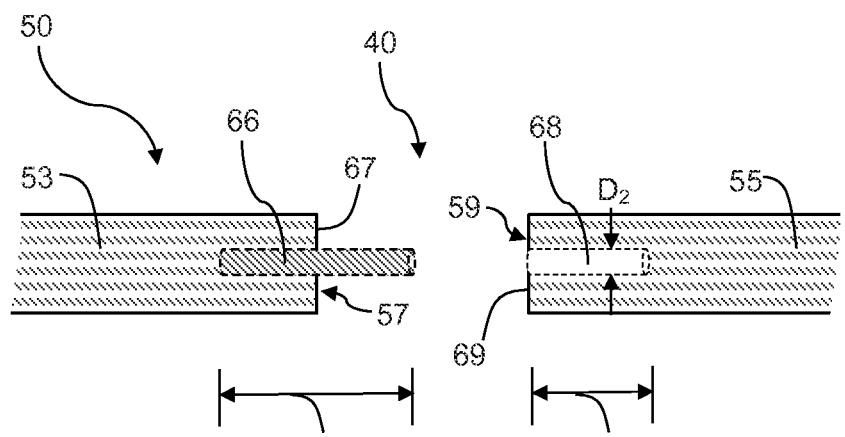
FIG. -6-

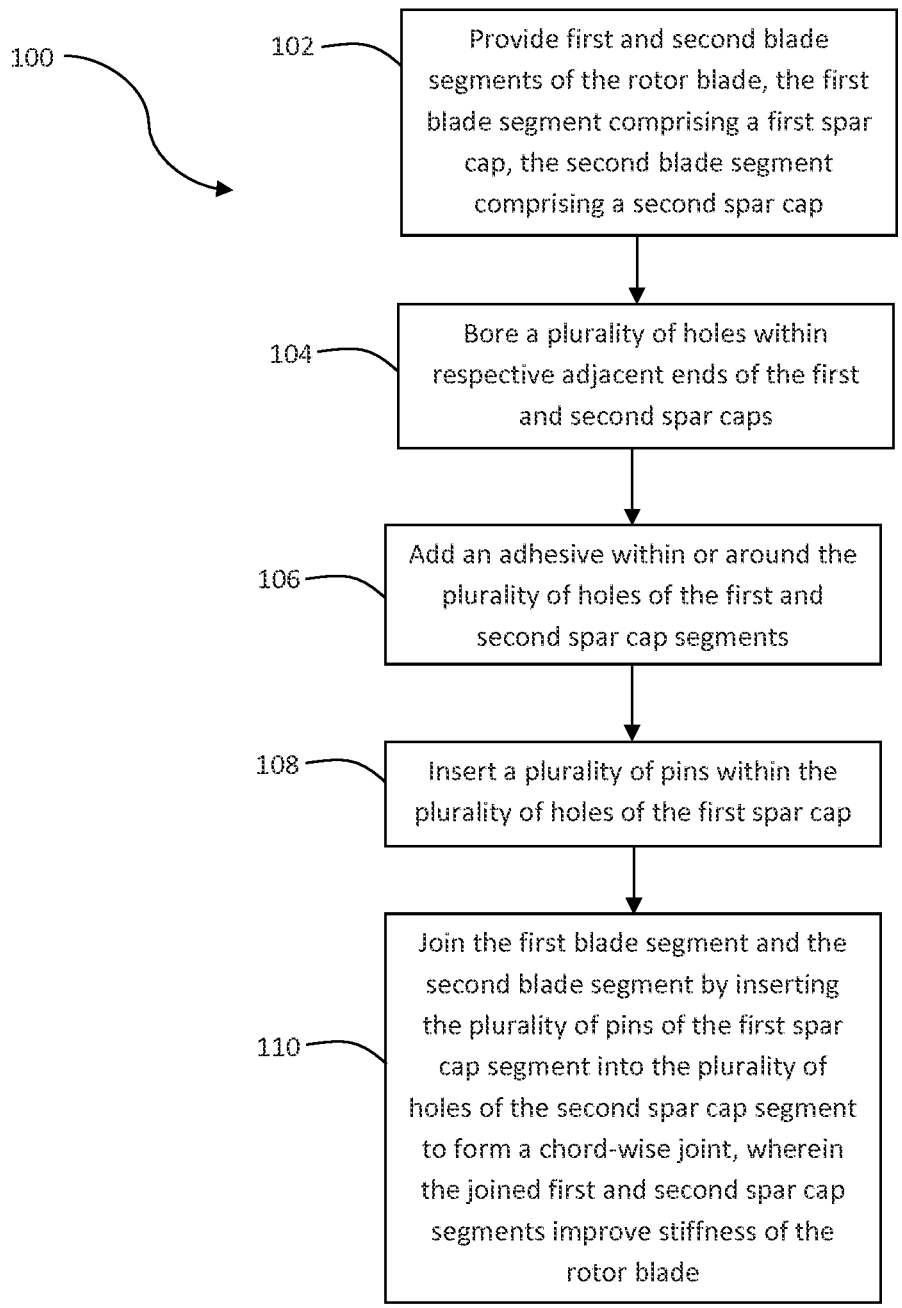
FIG. -7-

SPAR ASSEMBLY FOR A WIND TURBINE ROTOR BLADE

FIELD OF THE INVENTION

The present subject matter relates generally to wind turbines and, more particularly, to a spar assembly for a wind turbine rotor blade.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Conventional rotor blades typically include a shell formed from two shell halves coupled together along corresponding edges of the rotor blade. The shell halves and, thus, the shell are relatively lightweight and have insufficient structural properties (e.g., stiffness and strength) to withstand the bending moments and other loads exerted on the rotor bade during operation. In addition, the size, shape, and weight of rotor blades are factors that contribute to energy efficiencies of wind turbines. For example, an increase in rotor blade size increases the energy production of a wind turbine, while a decrease in weight also furthers the efficiency of a wind turbine. As rotor blade sizes grow, extra attention needs to be given to the structural integrity of the rotor blades. Thus, it is known in the art to reinforce the shell using a spar assembly consisting of a pair of opposed spar caps and a shear web extending perpendicularly between the opposed spar caps. This conventional spar configuration generally provides a rotor blade with a relatively high, constant stiffness. However, the spar caps are typically large (e.g. extending the span of the rotor blade) and difficult to install.

In addition, as the size of the rotor blades increases, so do the respective costs of manufacturing, transporting, and assembling of the wind turbines. One known strategy for reducing the costs of pre-forming, transporting, and erecting wind turbines with rotor blades of increasing sizes is to manufacture the rotor blades in blade segments. The blade segments may be assembled to form the rotor blade after, for example, the individual blade segments are transported to an erection location. However, known joint designs and assembly processes may have a variety of disadvantages. For example, many joint designs include a scarf joint having opposing tapered ends which are then fitted together. The scarf joints, however, involve a time consuming and expensive scarfing operation that must be completed for the spar caps of the existing blade before the blade segments can be joined together.

Blade tip extensions are also known in the art for increasing the length of rotor blades. Such extensions are typically installed by cutting a rotor blade in half and inserting a middle portion between the two halves so as to extend the rotor blade. Similar to the blade segments discussed above, blade tip extensions experience similar disadvantages in known joint designs.

Accordingly, there is a need for an improved spar assembly that addresses the aforementioned issues.

BRIEF DESCRIPTION OF THE INVENTION

Aspects and advantages of the invention will be set forth in part in the following description, or may be obvious from the description, or may be learned through practice of the invention.

In one aspect, a rotor blade assembly for a wind turbine is disclosed. The rotor blade assembly includes a rotor blade having a first blade segment and a second blade segment. Each blade segment includes a pressure side shell member and an opposite suction side shell member. The rotor blade assembly includes a spar assembly includes a first spar cap segment and a second spar cap segment. The first spar cap segment is configured on an interior surface of the first blade segment. The second spar cap segment is configured on an interior surface of the second blade segment. Each of the spar cap segments includes respective adjacent ends having complementary first and second joint sections that are joinable at a chord-wise joint. Each of the first and second joint sections includes a plurality of holes formed therein. The spar assembly further includes a plurality of pins inserted into the plurality of holes of the first and second joint sections to join the first and second blade segments so as to improve stiffness of the rotor blade.

In a further embodiment, the plurality of pins are dowel pins. In addition, the dowel pins may be constructed of any suitable material. For example, in one embodiment, the dowel pins are constructed of fiberglass, carbon, or similar. In another embodiment, the plurality of pins may have any suitable cross-sectional shape, including, but not limited to a: circle, square, rectangle, star, daisy, triangle, oval, diamond, or similar, or any combinations thereof. Additionally, the plurality of pins may be spaced apart any suitable distance. For example, in one embodiment, the plurality of pins and corresponding plurality of holes may be spaced apart in a chord-wise direction at least three millimeters.

In still further embodiments, the first spar cap segment may be configured on one of the pressure side shell member or the suction side shell member of the first blade segment and the second spar cap segment may be configured on a corresponding shell member of the second blade segment. In additional embodiments, the first and second blade segments abut against one another to form the chord-wise join when the plurality of pins of the first spar cap segment are inserted into the plurality of holes of the second spar cap segment. In yet another embodiment, the rotor blade assembly may also include a middle spar cap segment configured on an interior surface of a middle blade segment. The middle blade segment may be configured between the first and second blade segments. Further, the middle spar cap segment may include complementary joint sections on its respective ends that are joinable at chord-wise joints. Each of the joint sections of the middle spar cap segment include a plurality of holes formed therein, wherein a portion of the plurality of pins are inserted into the plurality of holes of the joint sections to join the middle blade segment between the first and second blade segments.

In addition, the rotor blade assembly may further include an additional spar cap disposed on an opposite shell member from the first and second spar cap segments. As such, the additional spar cap may be spaced apart from the first and second spar cap segments such that a cross-sectional area is defined directly between the first and second spar cap segments and the additional spar cap. Further, the rotor blade assembly may include a web between the joined first and second spar cap segments and the additional spar cap. In a further embodiment, the web may be oriented substantially perpendicularly between the joined first and second spar cap segments and the additional spar cap. In yet another embodiment, the rotor blade assembly may include a structural cover around at least a portion of the chord-wise joint to provide further stiffening to the rotor blade.

In still a further embodiment, the rotor blade assembly may include an adhesive between any of or a combination of the following locations: within the plurality of holes of the first and second spar cap segments, around the chord-wise joint formed by the first and second spar cap segments, or any other suitable location to provide further support to the assembly. The adhesive may be any suitable adhesive including an epoxy-based adhesive, a polyester-based adhesive, a methyl methacrylate adhesive, or similar, or any combinations thereof. In additional embodiments, a gap between the first and second blade segments in a joined configuration may have any suitable tolerance. For example, in one embodiment, the tolerance between the first and second blade segments is less than one millimeter.

In another aspect, a method of assembling a rotor blade for a wind turbine is disclosed. The method includes a first step of providing first and second blade segments of the rotor blade. The first blade segment includes a first spar cap segment and the second blade segment includes a second spar cap segment. A next step includes boring a plurality of holes within respective adjacent ends of the first and second spar cap segments. The method also includes inserting a plurality of dowel pins within the plurality of holes of the first spar cap segment. Next, the method may include joining the first blade segment and the second blade segment by inserting the plurality of pins of the first spar cap segment into the plurality of holes of the second spar cap segment to form a chord-wise joint, wherein the joined first and second spar cap segments improve stiffness of the rotor blade.

In another embodiment, the method further includes installing the first spar cap segment on an interior surface of one of the pressure side shell member or a suction side shell member of the first blade segment, and installing the second spar cap segment on a corresponding interior surface of the second blade segment. In a further embodiment, the method includes: providing a middle blade segment having a middle spar cap segment; boring a plurality of holes within respective ends of the middle spar cap segment; inserting a plurality of pins within the plurality of holes of at least one of the ends of the middle spar cap segment; and, joining the middle blade segment between the first and second blade segments by inserting the plurality of pins of the first spar cap segment into the plurality of holes of the middle spar cap segment and inserting the plurality of pins of the middle blade segment within the plurality of holes of the and second blade segment. In yet another embodiment, the method may further include installing a structural cover around at least a portion of the chord-wise joint to provide further stiffening to the rotor blade.

In yet another embodiment, the method further includes adding an adhesive to at least one of the following locations: within at least one of the plurality of holes of the first and second spar cap segments, around the chord-wise joint formed by the first and second spar cap segments, or any other suitable location. As such, the method may further include inserting the plurality of pins within the plurality of holes of the first spar cap segment; allowing the adhesive within at least one of the plurality of holes in the first spar cap segment to cure; and after curing, inserting the plurality of pins of the first spar cap segment within the plurality of holes of the second spar cap segment.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a wind turbine of conventional construction;

FIG. 2 illustrates a perspective view of one embodiment of a rotor blade of a wind turbine according to the present subject matter;

FIG. 3 illustrates a partial cut-away view showing aspects of the rotor blade between adjacent blade segments according to one embodiment of the present disclosure;

FIG. 4 illustrates a perspective view of a portion of the first and second spar cap segments according to one embodiment of the present disclosure;

FIG. 5 illustrates a detailed side view of a portion of the first and second spar cap segments of FIG. 4;

FIG. 6 illustrates a detailed side view of a portion of the first and second spar cap segments in a disassembled state; and FIG. 7 illustrates one embodiment of a method of assembling a rotor blade for a wind turbine according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a spar assembly for a wind turbine rotor blade having multiple spar cap segments joined by a plurality of dowel pins. The spar assembly is configured to serve as the primary structural element of the rotor blade by carrying the aerodynamic and inertial (or primary) loads acting on the rotor blade, such as flapwise, edgewise and/or torsional loads. Additionally, the spar assembly may be configured to provide increased load alleviation and deflection control to the rotor blade.

It should be appreciated that the disclosed spar assembly may generally provide numerous advantages for the wind turbine rotor blade. For example, by configuring the spar assembly to carry the primary loads acting on the rotor blade, the structural components of the blade may be completely divorced from the rotor blade's skin or shell, which may route local aerodynamic loads to the spar assembly. As such, the shell may be designed as a non-load bearing component of the rotor blade. This may allow the overall thickness of the shell to be reduced significantly, resulting in both a mass and a material cost reduction. Further, the spar assembly reduces cost and installation time for rotor blades having multiple segments.

Referring now to the drawings, FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft (not shown). The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring now to FIG. 2, one embodiment of a rotor blade 16 in accordance with the present disclosure is shown. In the illustrated embodiment, the rotor blade 16 includes a plurality of blade segments 20 aligned in an end-to-end span-wise order from a blade tip 22 to a blade root 24. Each of the individual blade segments 20 may be uniquely configured so that the plurality of blade segments 20 define a complete rotor blade 16 having a designed aerodynamic profile, length, and other desired characteristics. For example, each of the blade segments 20 may have an aerodynamic contour that corresponds to the aerodynamic contour of adjacent blade segments 20. Thus, the aerodynamic contours of the blade segments 20 may form a continuous aerodynamic contour of the rotor blade 16.

In general, the rotor blade 16, and thus each blade segment 20, includes a pressure side shell member 32 and a suction side shell member 34 extending between a leading edge 36 and a trailing edge 38. Additionally, the rotor blade 16 may have a span 42 and a chord 44. The chord 44 may change throughout the span 42 of the rotor blade 16. Thus, a local chord 46 may be defined at any span-wise location on the rotor blade 16 or any blade segment 20 thereof.

FIGS. 2 through 6 illustrate various embodiments of a chord-wise joint 40 for connecting adjacent blade segments 20 of the rotor blade 16, such as a first blade segment 62, a middle blade segment 65, and a second blade segment 64. It should be understood that the blade segments 62, 64, 65 may be any suitable adjacent blade segments 20. For example, in some embodiments the first blade segment 62 may extend from the blade root 24 and the second blade segment 64 may extend from blade tip 22, or vice-versa, whereas the middle blade segment 65 may be any intermediary segment configured between the first and second blade segments 62, 64. The invention is not limited to any number of blade segments 20 within a turbine blade, or any number of joints 40. The separate blade segments 62, 64, 65 may be brought together for joining at the joint 40 along a line of movement 70 (FIG. 3) that is generally parallel to the span-wise direction. For example, in certain embodiments, one of the blade segments may be maintained stationary while the other blade segment is essentially inserted onto the stationary blade segment by axial insertion of one blade segment into the other blade segment.

Referring now to FIG. 3, a partial cutaway view of a plurality of joints 40 between adjacent blade segments 20, namely the first blade segment 62, the middle blade segment 65, and the second blade segment 64, is illustrated. A portion of the suction side shell member 34 has been removed from the second blade segment 64 to reveal the underlying joints 40. As shown, the rotor blade 16 also includes a spar assembly 50 running span-wise between the shell members 32, 34. In the illustrated embodiment, for example, the spar assembly 50 includes a suction side spar cap 52, a pressure side spar cap 54, and shear web 58 extending therebetween. At least one of the suction side spar cap 52 or the pressure side spar cap 54 can be segmented. For example, as shown in FIGS. 3 and 4, the suction side spar cap 52 includes at least a first spar cap segment 53 and a second spar cap segment 55. The first spar cap segment 53 is configured on the suction side 34 of one of the blade segments 20, e.g. the first blade segment 62, whereas the second or middle spar cap segment 55 is configured on the suction side 34 of the second or middle blade segments 64, 65. Further, the pressure side spar cap 54 may also be referred to herein as an additional spar cap 56. Thus, as shown, the pressure side spar cap 54 (i.e. the additional spar cap 56) is spaced apart from the first and second spar cap segments 53, 55 such that a cross-sectional area is defined directly between the first and second spar cap segments 53, 55 and the additional spar cap 56.

Referring now to FIGS. 3-6, the first 53 and second 55 spar cap segments include respective adjacent ends 67, 69 having complementary joint sections 57, 59 that are joined to define the chord-wise joint 40. More specifically, the first joint section 57 and the second joint section 59 each include a plurality of holes 68. In one embodiment, as shown, the holes 68 extend a depth d within the first and second joint sections 57, 59. Alternatively, the holes 68 may extend the entire length of the first and second spar cap segments 53, 55. In addition, a plurality of pins 66 are inserted into the plurality of holes 68 of the first and second joint sections 57, 59 so as to join the two spar cap segments 53, 55 together. More specifically, when two of the blade segments 20 are brought together in a generally transverse direction, as indicated by the arrow 70, the joint profiles 67, 69 match and engage each other, as depicted in FIGS. 3-5, which illustrates the segments 20 in a joined state. More specifically, when at least two of the blade segments 20 are joined together by corresponding spar cap segments, the blade segments 20 abut against one another. In a further embodiment, a gap 74 may be defined between the blade segments 20 having a suitable tolerance. For example, in one embodiment, the gap 74 may have a tolerance of one millimeter or less.

Referring particularly to FIG. 4, the plurality of pins 66 and corresponding plurality of holes 68 may be spaced apart in a chord-wise direction any suitable distance 72. For example, in one embodiment, the distance 72 is at least three millimeters. In still further embodiments, the distance 72 may be more than three millimeters or less than three millimeters. In addition, and referring to FIGS. 5-6, the pins 66 may have any suitable diameter $D_1$ and length L. For example, in one embodiment, the length L of the pins 66 may be approximately 240 millimeters (mm). In still further embodiments, the length L may be more than 240 mm or less than 240 mm. Additionally, in one embodiment, the diameter $D_1$ of the pins 66 may be approximately 12 mm. In still further embodiments, the diameter $D_1$ may be more than 12 mm or less than 12 mm. Similarly, the diameter $D_2$ and depth d of the holes 68 can be constructed to correspond with the diameter $D_1$ and length L of the pins 66. For example, as shown in FIG. 6, the depth d of the hole 68 is approximately equal to half of the length L of the pin 66. Further, in one embodiment, the pins 66 are installed at a depth d ranging from 100 mm to 150 mm, more preferably 120 mm. Moreover, the diameter $D_2$ of the hole 68 is slightly greater than the diameter $D_1$ of the pin 66 such that the pin 66 frictionally engages the hole 68. In still further embodiments, any suitable number of pins 66 may be used to join the first and second spar cap segments 53, 55 of the first and second blade segments 62, 64. For example, in one embodiment, a total of fourteen pins 60 may be used. In still further embodiments, more than fourteen or less than fourteen pins 66 may be employed.

In addition, the plurality of pins 66 may be any suitable pins known in the art, such as, for example, dowel pins. Further, the dowel pins may be made of any suitable material. For example, in one embodiment, the dowel pins are constructed of fiberglass, carbon, or similar. In still further embodiments, the plurality of pins may have any suitable cross-sectional shape. For example, the cross-sectional shape of the pins may be circular, square, rectangular, star, daisy, triangular, oval, diamond, or similar.

Referring back to FIG. 2, the rotor blade assembly may also include a structural cover 60. The structural cover 60 may cover the entire chord-wise joint 40 or only a portion of the chord-wise joint 40. Further, the structural cover 60 is configured to provide further stiffening to the rotor blade 16.

The present invention also encompasses various method embodiments for assembling the rotor blade 16 from at least two blade segments 20, wherein each of the blade segments 20 includes a spar cap segment. Referring to FIG. 7, for example, the method 100 includes a step 102 of providing first and second blade segments of the rotor blade. The first blade segment includes a first spar cap segment and the second blade segment includes a corresponding second spar cap segment. The method 100 may also include a step 104 of boring a plurality of holes within respective adjacent ends of the first and second spar cap segments. In addition, the method 100 may include a step 106 of adding an adhesive within or around the plurality of holes of the first and second spar cap segments. As such, in one embodiment, the method 100 may further include inserting the plurality of pins within the plurality of holes of the first spar cap segment; allowing the adhesive within the plurality of holes in the first spar cap segment to cure; and after curing, inserting the plurality of pins within the plurality of holes of the second spar cap segment.

A next step 108 may include inserting a plurality of pins within the plurality of holes of the first spar cap segment. The method 100 may also include a step 110 of joining the first blade segment and the second blade segment by inserting the plurality of pins of the first spar cap segment into the plurality of holes of the second spar cap segment to form a chord-wise joint, wherein the joined first and second spar cap segments improve stiffness of the rotor blade. In addition, the method 100 may further include adding an adhesive around and/or between the chord-wise joint to provide further stiffness and/or strength to the joint. In a further embodiment, the method 100 may further include allowing the adhesive around and/or between the joint to cure.

In another embodiment, the method 100 may also include providing a middle blade segment having a middle spar cap segment. Further, the method 100 may include boring a plurality of holes within respective ends of the middle spar cap segment and inserting a plurality of pins within the plurality of holes of at least one of the ends of the middle spar cap segment. As such, the method 100 may also include joining the middle blade segment between the first and second blade segments by inserting the plurality of pins of the first spar cap segment into the plurality of holes of the middle spar cap segment and inserting the plurality of pins of the middle blade segment within the plurality of holes of the and second blade segment.

In still additional embodiments, the method 100 may also include a step of installing the first spar cap segment on an interior surface of one of the pressure side shell member or a suction side shell member of the first blade segment. Further, a second spar cap segment may be installed on a corresponding interior surface of the second blade segment such that the first and second spar cap segments can be joined together via the plurality of pins to form the chord-wise joint. In a further embodiment, the method 100 may further include installing a structural cover around at least a portion of the chord-wise joint to provide further stiffening to the rotor blade.

In further embodiments, the method 100 may include positioning the spar cap segments such that respective joint sections of the spar cap segments are generally aligned in an end-to-end orientation for subsequent joining of the joint sections. The spar cap segments are moved such that the pins of the first spar cap segment can be inserted into the holes of the second spar cap segment. This is accomplished with any combination of relative movement between the spar cap segments. For example, in one of the method embodiments, the spar cap segments may first be brought into a span-wise alignment by a pure axial movement. One of the spar cap segments may be held stationary in this process. The aligned joint sections may then be brought into engagement by inserting the pins of the first spar cap segment into the holes of the second spar cap segment. In an alternate method embodiment, the process of moving the spar cap segments into axial alignment and inserting one of the spar cap segments into the other may be accomplished in the same continuous movement.

Once the first and second blade segments are joined by the first and second spar cap segments, the first and second blade segments are configured to abut against one another. In a further embodiment, a gap may be defined between the first and second blade segments having a suitable tolerance. For example, in one embodiment, the gap may have a tolerance of one millimeter or less.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, the rotor blade assembly comprising:

a rotor blade comprising a first blade segment and a second blade segment, each segment comprising a pressure side shell member and an opposite suction side shell member; and, a spar assembly comprising a first spar cap segment and a second spar cap segment, the first spar cap segment configured on an interior surface of the first blade segment, the second spar cap segment configured on an interior surface of the second blade segment, each of the spar cap segments comprising respective adjacent ends having complementary first and second joint sections that are joinable at a chord-wise joint, each of the first and second joint sections including a plurality of holes formed therein, the spar assembly further comprising a plurality of dowel pins each having a solid cross-section inserted into the plurality of holes of the first and second joint sections to join the first and second blade segments, wherein the dowel pins are fixed in the plurality of holes with an adhesive.

2. The rotor blade assembly of claim 1, wherein the dowel pins comprise at least one of fiberglass or carbon.

3. The rotor blade assembly of claim 1, wherein the first spar cap segment is configured on one of the pressure side shell member or the suction side shell member of the first blade segment and the second spar cap segment is configured on a corresponding shell member of the second blade segment.

4. The rotor blade assembly of claim 3, wherein the spar assembly further comprises an additional spar cap disposed on an opposite shell member from the first and second spar cap segments, the additional spar cap being spaced apart from the first and second spar cap segments such that a cross-sectional area is defined directly between the first and second spar cap segments and the additional spar cap.

5. The rotor blade assembly of claim 4, further comprising a web between the first and second spar cap segments and the additional spar cap, wherein the web is oriented substantially perpendicularly to the first and second spar cap segments and the additional spar cap.

6. The rotor blade assembly of claim 5, further comprising a structural cover around at least a portion of the chord-wise joint to provide further stiffening to the rotor blade.

7. The rotor blade assembly of claim 1, wherein the first blade segment and the second blade segment abut against one another when the plurality of dowel pins of the first spar cap segment are inserted into the plurality of holes of the second spar cap segment.

8. The rotor blade assembly of claim 1, further comprising a middle spar cap segment configured on an interior surface of a middle blade segment, the middle blade segment configured between the first and second blade segments, the middle spar cap segment comprising complementary joint sections on its respective ends that are joinable at chord-wise joints, each of the joint sections of the middle spar cap segment including a plurality of holes formed therein, wherein a portion of the plurality of dowel pins are inserted into the plurality of holes of at least one of the joint sections to join the middle blade segment between the first and second blade segments.

9. The rotor blade assembly of claim 1, wherein the adhesive is located within or around the plurality of holes of the first and second spar cap segments.

10. The rotor blade assembly of claim 9, wherein the adhesive is one of an epoxy-based adhesive, a polyester-based adhesive, or a methyl methacrylate adhesive.

11. The rotor blade assembly of claim 1, wherein the plurality of dowel pins and corresponding plurality of holes are spaced apart at least three millimeters.

12. The rotor blade assembly of claim 1, wherein a gap between the first blade segment and the second blade segment has a tolerance of one millimeter or less.

13. The rotor blade assembly of claim 1, wherein the plurality of dowel pins comprise one of the following cross-sectional shapes: circle, square, rectangle, star, daisy, triangle, oval, or diamond.

14. A method of assembling a rotor blade for a wind turbine, the method comprising:
providing first and second blade segments of the rotor blade, the first blade segment comprising a first spar cap segment, the second blade segment comprising a second spar cap segment;
boring a plurality of holes within respective adjacent ends of the first and second spar cap segments;
inserting a plurality of dowel pins each having a solid cross-section within the plurality of holes of the first spar cap segment; and,
joining the first blade segment and the second blade segment by inserting the plurality of dowel pins of the first spar cap segment into the plurality of holes of the second spar cap segment to form a chord-wise joint, wherein the joined first and second spar cap segments improve stiffness of the rotor blade and wherein the dowel pins are fixed in the plurality of holes with an adhesive.

15. The method of claim 14, further comprising installing the first spar cap segment on an interior surface of one of the pressure side shell member or a suction side shell member of the first blade segment, and installing the second spar cap segment on a corresponding interior surface of the second blade segment.

16. The method of claim 14, further comprising:
providing a middle blade segment having a middle spar cap segment;
boring a plurality of holes within respective ends of the middle spar cap segment;
inserting a plurality of dowel pins within the plurality of holes of at least one of the ends of the middle spar cap segment; and,
joining the middle blade segment between the first and second blade segments by inserting the plurality of dowel pins of the first spar cap segment into the plurality of holes within one of the respective ends of the middle spar cap segment and inserting the plurality of dowel pins of the middle blade segment within the plurality of holes of the and second blade segment.

17. The method of claim 14, further comprising installing a structural cover around at least a portion of the chord-wise joint to provide further stiffening to the rotor blade.

18. The method of claim 14, wherein the adhesive is added within or around the plurality of holes of the first and second spar cap segments or around the chord-wise joint formed by the first and second spar cap segments.

19. The method of claim 18, further comprising inserting the plurality of dowel pins within the plurality of holes of the first spar cap segment; allowing the adhesive within the plurality of holes of the first spar cap segment to cure; after curing, inserting the plurality of dowel pins of the first spar cap segment within the plurality of holes of the second spar cap segment.

* * * * *